United States Patent
Kwoka et al.

(10) Patent No.: US 6,874,605 B2
(45) Date of Patent: Apr. 5, 2005

(54) CONTROLLABLE VISCOUS COUPLING

(75) Inventors: Georg Kwoka, Much (DE); Adrian Chludek, St. Augustin (DE)

(73) Assignee: GKN Viscodrive GmbH, Lohmar (DE)

( * ) Notice: Subject to any disclaimer, the term of this patent is extended or adjusted under 35 U.S.C. 154(b) by 0 days.

(21) Appl. No.: 10/460,379

(22) Filed: Jun. 12, 2003

(65) Prior Publication Data

US 2004/0020739 A1 Feb. 5, 2004

(30) Foreign Application Priority Data

Jun. 13, 2002 (DE) .......................... 102 26 147

(51) Int. Cl.[7] .............................................. F16D 35/00
(52) U.S. Cl. ...................... 192/48.3; 192/57; 192/58.41; 192/84.7; 192/84.8
(58) Field of Search ...................... 192/48.3, 57, 58.41, 192/84.1, 84.7, 84.8

(56) References Cited

U.S. PATENT DOCUMENTS

| | | | | | |
|---|---|---|---|---|---|
| 4,885,957 A | * | 12/1989 | Taureg et al. | ................ | 475/89 |
| 5,086,867 A | * | 2/1992 | Hirota et al. | ................ | 180/248 |
| 5,338,266 A | * | 8/1994 | Guimbretiere | ................ | 475/89 |
| 6,267,214 B1 | * | 7/2001 | Kwoka | ....................... | 192/48.5 |

* cited by examiner

*Primary Examiner*—Saul Rodriguez

(57) ABSTRACT

The invention relates to a controllable viscous coupling for generating a locking effect between two coupling parts rotatable relative to one another around a common longitudinal axis, more particularly for the driveline of a motor vehicle. The viscous coupling comprises a first coupling part, a second coupling part, wherein the first and the second coupling part form a sealed annular chamber. First plates are connected to the first coupling part in a rotationally fast way and second plates are connectable to the second coupling part in a rotationally fast way, as well as controllable connecting means to allow switching between an open position in which the second plates are freely rotatable relative to the second coupling part, and a closed position in which the second plates are connected to the second coupling part in a rotationally fast way.

16 Claims, 2 Drawing Sheets

CONTROLLABLE VISCOUS COUPLING

FIELD OF INVENTION

The invention relates to a controllable viscous coupling for generating a coupling effect between two coupling parts which are rotatable relative to one another around a common longitudinal axis, more particularly for the driveline of a motor vehicle.

BACKGROUND OF INVENTION

German Publication DE 38 34 555 C1 discloses a fluid friction coupling for optionally connecting or blocking the differential effect of the drive of the driving wheels of a motor vehicle. This fluid friction coupling comprises a first coupling part provided in the form of a hub and a second coupling part which is rotatable relative to the first coupling part and which is provided in the form of a housing. The hub and housing, jointly, form a sealed annular chamber in which inner plates and outer plates are alternately received in the longitudinal direction. The inner plates are connected to the hub in a rotationally fast and axially displaceable way. The outer plates are loosely arranged between supporting rings received in the housing in a rotationally fast and axially displaceable way. By activating an operating device, there is generated an axial force so that the supporting rings are axially pressure-loaded, thus achieving a friction-locking effect between the supporting rings and the plates received therebetween. In this way, the torque transmitting capacity can be controlled and adapted to the respective desired operating conditions. A disadvantage of this fluid friction coupling for controlling the torque transmitting capacity is that, as a result of the large number of components, its assembly is relatively complex.

German publication DE 199 18 411 A1, discloses a controllable viscous coupling. In contrast to the above coupling, the annular chamber contains three functionally different sets of coupling plates of which each inner set comprises first plates and each outer set comprises second plates. The plates of the first set are connected in a rotationally fast way to the respective coupling part. To adapt the viscous coupling to different driving conditions of the vehicle, the two remaining sets comprising different diameters are provided with coupling discs for connecting and disconnecting the outer second plates to and from the housing. In this way, the torque transmitting capacity can be adapted more accurately to the existing operating conditions.

OBJECT OF THE INVENTION

It is the object of the present invention to provide a controllable viscous coupling for generating a locking effect between two coupling parts which are rotatable relative to one another around a common longitudinal axis, more particularly for the driveline of a motor vehicle, which viscous coupling has a simpler design and permits a rapid and direct adaptation to different driving conditions of the motor vehicle.

SUMMARY OF THE INVENTION

The objective is achieved by providing a controllable viscous coupling for generating a locking effect between two coupling parts rotatable relative to one another around a common longitudinal axis for the driveline of a motor vehicle. The coupling comprises a first coupling part and a second coupling part. The first and the second coupling parts form a sealed annular chamber which is at least partially filled with a highly viscous medium. First plates are connected to the first coupling part in a rotationally fast way and second plates are connected to the second coupling part in a rotationally fast way, wherein the first and the second plates are arranged in the annular chamber so as to alternate in the longitudinal direction. A controllable connecting means is settable between an open position in which the second plates are freely rotatable relative to the second coupling part, and a closed position in which the second plates are connected to the second coupling part in a rotationally fast way. The connecting means is supported in the second coupling part and the radially loads the second plates on the outer circumference.

The advantage of this embodiment is that when the control system for driving dynamics controllingly acts on the driving dynamics of the motor vehicle, the viscous coupling can be completely and quickly disconnected. In this way, the two drive parts drivingly connected by the viscous coupling are disconnected completely, so that they can no longer influence one another. This is particularly important when activating an anti-lock (ABS) or an electronic stabilization program (ESP), so that activation can take place in an optimum way. Because the connecting means act radially on the outer circumference of the second plates, these can, in an easy way, be simultaneously connected and disconnected. It is necessary to provide an actuating device for controlling the connecting means.

According to a preferred embodiment, the second plates are connected to the connecting means in a friction locking way when the latter are in the closed condition. According to a further variant thereof, the second plates are connected to the connecting means in a form-fitting way when the latter are in the closed condition.

According to a further embodiment of the invention, the second plates preferably form the outer plates, wherein the connecting means is effective between the outer plates and the second coupling part in the form of a rotational housing. Because the available space in the radially outer region of the viscous coupling is larger than in the radial inside, the connecting means can easily be accommodated therein.

According to a preferred further embodiment, the connecting means may comprise at least one wedge element which is axially displaceable between a first position and a second position, and at least one brake jaw which, on its outside, comprises a wedge face which rises in the axial direction and can be actuated by the wedge element, and which brake jaw furthermore acts on the second plates.

The brake jaw is preferably supported in a recess in the inside of the second coupling part so as to be pivotable around a tilting axis extending parallel to the longitudinal axis. In a cross-sectional view, the brake jaw, furthermore, comprises a concave inner face for providing a friction-locking connection with the second plates, as well as a convex outer face. Between said convex outer face and the recess, there is available sufficient play for permitting a tilting movement of the brake jaw towards the plates and, respectively, away from same.

According to a preferred embodiment, the brake jaw, on its outside, comprises at least one radially outwardly directed projection which, more particularly, extends along the entire length and which engages a corresponding recess of the second coupling part and serves as an abutment and more particularly for accommodating circumferential forces acting on the brake jaw, but also for providing radial support.

This projection securely holds the brake jaw at the second coupling part in such a way that it is pivotable around the tilting axis.

The wedge element is preferably effective between the second coupling part and the brake jaw, and in a cross-sectional view, it applies a radial force to the brake jaw at a distance from the tilting axis, or releases same. By displacing the wedge element from the first into the second position, the brake jaw is loaded radially and pivots around its tilting axis towards the plates so that these are connected in a rotationally fast way to the associated coupling part. Because the brake jaw extends along the entire length of the annular chamber of the coupling, it acts on all second plates simultaneously.

According to a special embodiment, at least one projection on the outside of the brake jaw comprises at least one wedge face and that the corresponding recess comprises at least one counter face, which wedge face and counter face cooperate and, under the influence of circumferential forces acting on the brake jaw, push the latter radially inwardly.

In a preferred embodiment, there can be provided two opposed wedge faces and corresponding counter faces, so that when the circumferential faces act on the brake jaw after the wedge element has been actuated, there is generated a self-intensifying effect in both relative directions of rotation between the two coupling parts.

According to a further embodiment of the invention, the wedge element engages a longitudinally extending groove in the convex outer face of the brake jaw on the one hand and a longitudinally extending groove in the inner face of the second coupling part on the other hand. In this way, the wedge element is securely guided during the displacement movement.

In another preferred embodiment, the wedge element comprises a supporting face which is at least indirectly supported against a parallel counter face of the second coupling part, as well as a pressure face which forms a wedge together with the supporting face and which serves to load the wedge face of the respective brake jaw. As a result of the shape of the wedge element, the brake jaw, by being displaced in the sense of obtaining an increasing height by the wedge element, can be loaded radially and pressed against the surfaces of the second plates. By being displaced in the sense of obtaining an decreasing height by the wedge element, the brake jaw is again released and is able to pivot back, so that the plates are no longer jammed.

In a further embodiment, in its supporting face and in its pressure face, the wedge element comprises a plurality of oblong pockets which are distributed along the length of the wedge element and in which there are arranged rolling contact members to reduce the friction in the region of contact with the respective counter face, with the rolling contact members projecting beyond the supporting face and the pressure face respectively. This embodiment has a friction-reducing effect on the movement of the wedge element relative to the second coupling part and relative to the brake jaw. The wedge element is thus prevented from being jammed when being displaced into the engaged and disengaged positions. The length of the pockets is preferably greater than the maximum distance which can be covered by the wedge element between the first and the second position. In this way, it is ensured that over the entire displacement path which can be covered by the wedge element, the rolling contact members roll on the respective counter face and do not slide.

According to a preferred embodiment of the invention, the actuating device comprises an electromagnet and an anchor plate which is arranged at an axial distance from the electromagnet and is loaded by spring means in the direction away from the electromagnet. By means of a rolling contact bearing at the second coupling part, the electromagnet is coaxially rotatable relative to the second coupling part and axially non-displaceably supported relative thereto. The wedge element is firmly connected to the anchor plate.

According to a preferred further embodiment of the invention, there are provided three groups of connecting means each having one wedge element and one brake jaw which are uniformly circumferential distributed around the longitudinal axis, wherein the three wedge elements are firmly connected to the anchor plate and are displaced simultaneously when the actuating device is switched. By using several groups of connecting means, it is possible to increase the effective braking forces for generating a friction-locking connection between the plates and the second coupling part. In addition, because of the conditions of symmetry, there is achieved an advantageous distribution of force between the coupling part and the plates, so that the polygon of forces is closed, with the plates being held in their position centered on the longitudinal axis.

The viscous coupling in accordance with the invention functions as follows: By switching on the electromagnet, the anchor plate is drawn against same. As a result, the wedge elements which are firmly connected to the anchor plate are axially displaced towards the electromagnet. The brake jaws are released and pivot around the pivot axis away from the second plates, so that the latter are able to rotate freely relative to the second coupling part in the open position. In this way, it is ensured that the viscous coupling does not counteract when an electronic control system for driving dynamics acts on the driving dynamics of the motor vehicle. By switching off the driving dynamics, the anchor plate is loaded by the spring means, as a result of which the wedge elements are axially moved away from the electromagnet and the brake jaws are loaded by the wedge elements towards the second plates. In this way, the second plates are positively connected to the second coupling part and rotate jointly around the longitudinal axis in the closed position.

For certain applications, it may be necessary to kinematically reverse the above inventive principle, in which case, the brake jaws and the wedge elements have to be designed in such a way that the second plate, in the switched-off condition of the electromagnet with the anchor plate being loaded by the spring means, are able to rotate freely relative to the second coupling part. Thus when the electromagnet is switched on, they are indirectly connected in a friction-locking way to the second coupling part and jointly rotate around the longitudinal axis.

DETAILED DESCRIPTION OF THE INVENTION.

Figure 1:
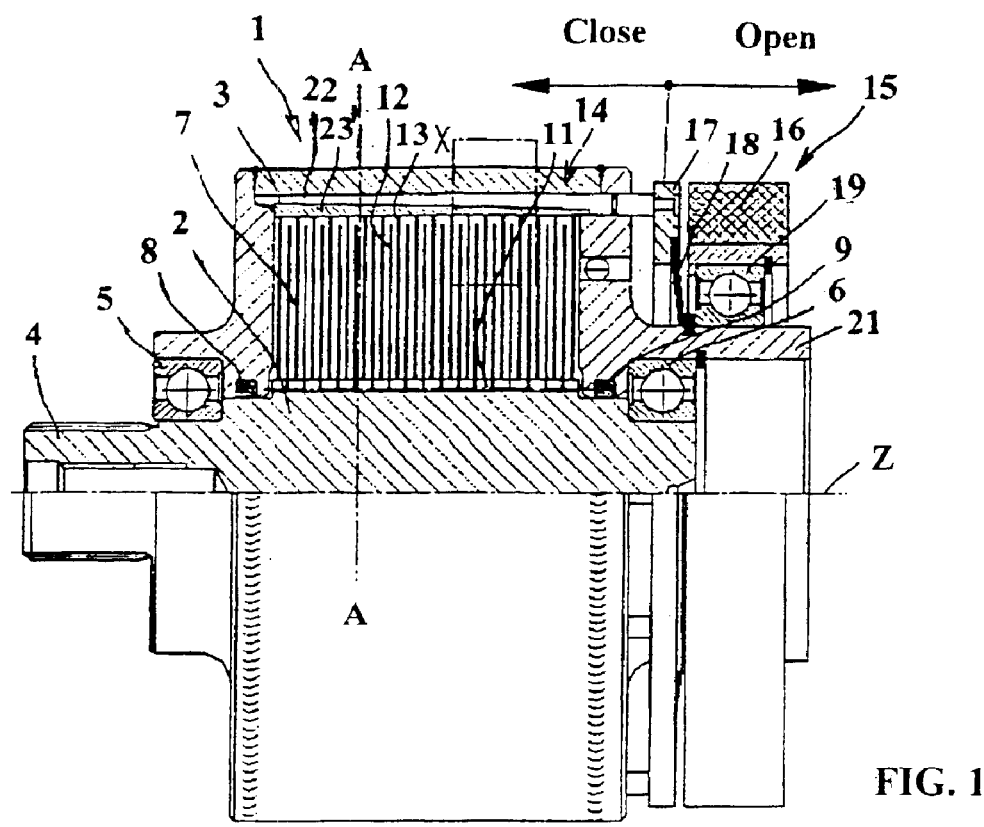
FIG. 1 illustrates a preferred embodiment of the invention of an inventive switchable viscous coupling in half a longitudinal section.

FIG. 1 shows a viscous coupling 1 which, substantially, consists of two coupling parts. The first coupling part is provided in the form of a hub 2 having a journal 4 at one end with longitudinal toothing for being connected in a rotationally fast way to a shaft. In this way, it is possible for the hub 2 to be rotatingly driven around a longitudinal axis Z. The second coupling part is provided in the form of a housing 3 which is coaxially and rotatably supported by rolling-contact bearings 5 and 6 on the hub 2. Between the hub 2 and the housing 3, there is formed a cylindrical annular chamber 7 which is sealed towards the outside by sealing means 8 and 9 and filled with a highly viscous medium.

Figure 2:
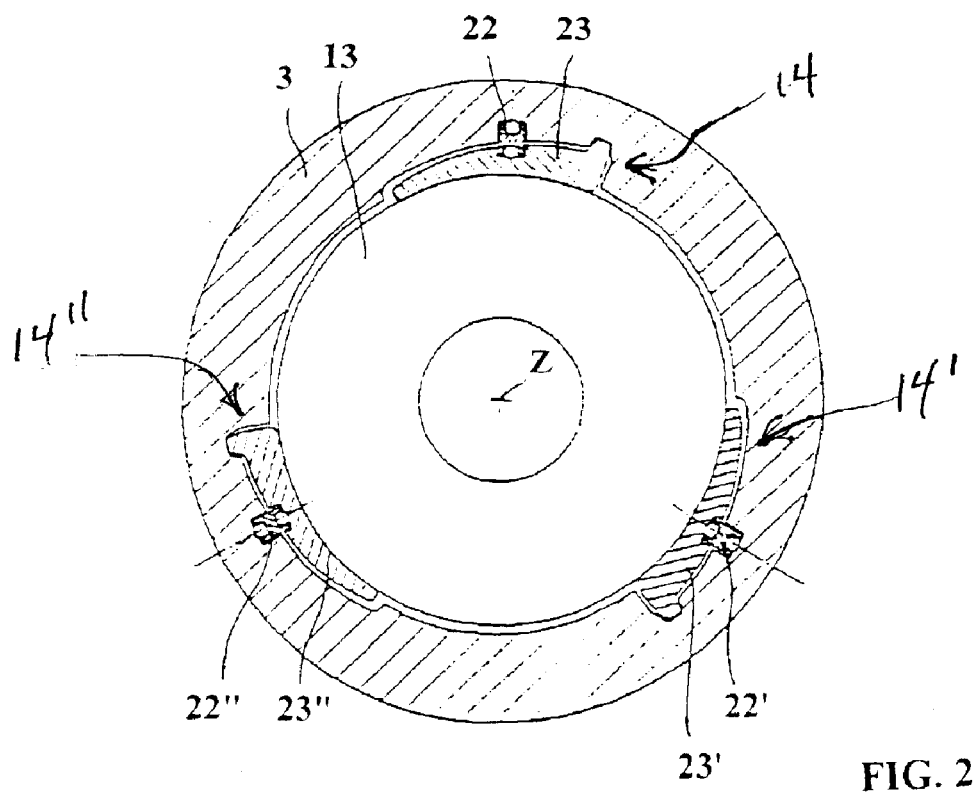
FIG. 2 illustrates the viscous coupling according to FIG. 1 in a cross-sectional view according to the sectional line A—A.

The hub 2 comprises outer toothing 11 on which first plates 12 are held in a rotationally fast and axially floating way. In the longitudinal direction, there are provided second plates 13 which alternate with the first plates, which project radially beyond the first plates 12 and which can be connected in a rotationally fast way to the housing 3 by a switching operation, or released therefrom. For this purpose, as can be seen in FIG. 2, there are provided three controllable connecting means 14, 14', 14" which are arranged so as to be uniformly circumferentially distributed around the longitudinal axis Z and which are jointly controlled by an actuating device 15.

The actuating device 15 comprises an electromagnet 16 and an axially adjoining disc-shaped anchor plate 17 which is loaded by spring means 18 away from the electromagnet 16 towards the annular chamber 7. The electromagnet 16 is supported by a rolling contact bearing 19 at a sleeve-shaped projection 21 of the housing 3 so as to be coaxially rotatable and axially non-displaceable relative thereto. The anchor plate 17 is axially displaceably arranged in the longitudinal direction between the electromagnet 16 and the housing 3. In the unswitched condition of the electromagnet 16, there is formed an axial gap between the latter and the anchor plate 17. When the electromagnet 16 is activated, the anchor plate 17 is drawn towards the electromagnet 16 against the force of the spring means 18, so that the gap is closed. As soon as the electromagnet 16 is switched off, the anchor plate 17 is released and moved by the force of the spring means 18 towards the annular chamber 7. This is the operating condition of the viscous coupling.

Figure 3:
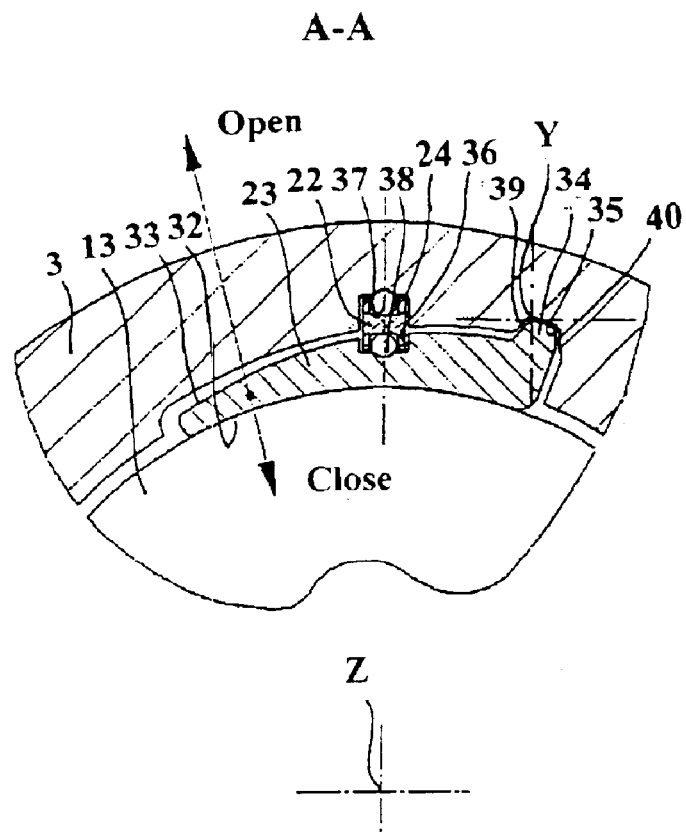
FIG. 3 illustrates an actuating unit according to FIG. 2 in detail.

The three connecting means 14, 14', 14" are actuated by the anchor plate 17 (FIG. 1). As the design and mode of operation of the three connecting means is identical, one of these will take the place of the three of them and will be described with reference to FIGS. 3 and 4.

Figure 4:
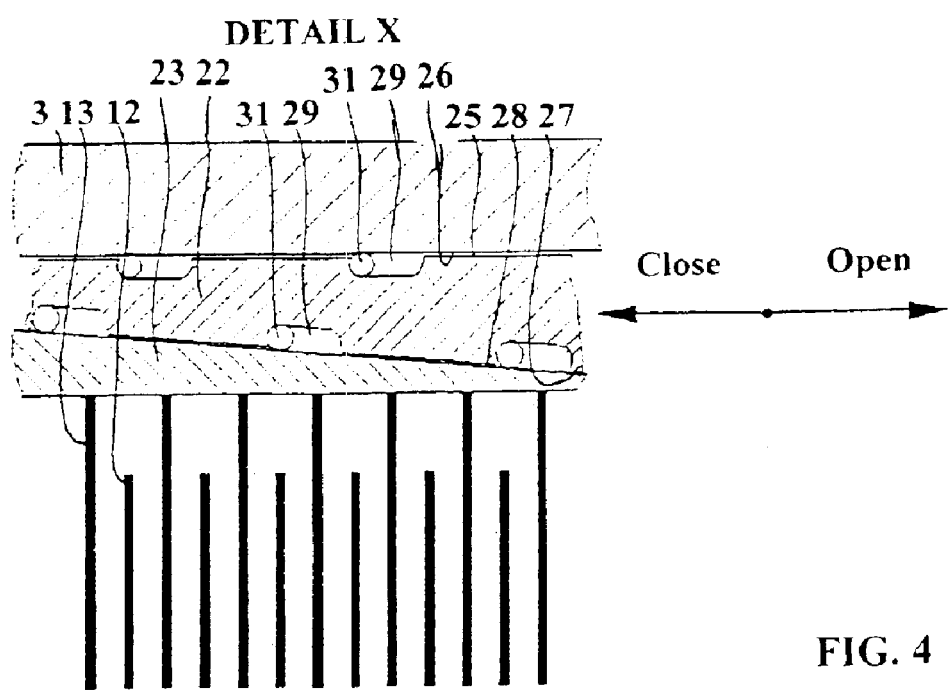
FIG. 4 illustrates the detail X of an actuating unit according to FIG. 1 in half a longitudinal section.

Each of the three connecting means 14 comprises a wedge element 22 which is axially displaceable between a first position and a second position, and a brake jaw 23 which is actuated by the wedge elements 22. The wedge element 22 is firmly connected to the anchor plate 17, so that, in the switched on condition of the electromagnet 16, the wedge element 22 is axially drawn towards the electromagnet 16, whereas, in the operating or switched off condition, it is displaced axially towards the opposite end of the viscous coupling 1 at which there is provided the journal 4. The wedge element 22 is positioned in a groove 24 on the inside of the housing 3, which groove 24 extends parallel to the longitudinal axis Z. The wedge element 22 comprises a supporting face 25 which is supported indirectly against the counter face 26 formed by the base of the groove 24, as well as a pressure face 27 which extends at an angle relative to the supporting face 25 and which serves to load a corresponding wedge face 28 of the brake jaw 23. In the supporting face 25 and in the pressure face 27, there is provided a plurality of oblong pockets 29 which are distributed along the length of the wedge element 22 and in which there are arranged rolling contact members 31 for reducing the friction in the region of contact with the respective counter faces 26 and 28 (FIG. 4). The diameter of the individual rolling contact members 31 is greater than the depth of the pockets 29 to ensure that the supporting face 25 and the pressure face 27 respectively remain out of contact with the respective counter face 26 and 28. The length of the pockets 29 is greater than the maximum displacement path which can be covered by the wedge element 22 between the first and the second position to ensure that the rolling contact members 31, along the entire displacement path, are in rolling contact with the respective counter face. In the embodiment according to FIG. 3, the rolling contact members 31 run in channels 37 of the groove 24 of the housing 3 and in channels 38 of the groove 36 of the brake jaw 23. Such channels are not provided in the embodiment according to FIG. 4, so that the brake jaw 23 has a degree of freedom in the circumferential direction.

The brake jaw 23 extends along the entire length of the annular chamber 7, thus covering all the second plates 13. On the inside of the housing 3, the brake jaw 23 is supported so as to be pivotable around a pivot axis Y which extends parallel to the longitudinal axis Z and, in a cross-sectional view, is sickle-shaped and provided with a concave inner face 32 whose curvature corresponds to the outer radius of the second plates 13, and with a convex outer face 33. At its thicker end at the outer face 33, which is thicker in a cross-sectional view, the brake jaw 23 comprises a radially outwardly directed projection 34 which extends along its entire length and which engages a corresponding recess 35 of the housing 3 and serves as an abutment around the tilting axis Y. Approximately in the center between the thicker end and the sickle-shaped end, the outer face 33 is provided with a longitudinally extending groove 36 whose base forms the wedge face 28 for the pressure face 27 of the wedge element 22. The wedge face 28, if viewed in a longitudinal section as shown in FIG. 4, extends at an angle relative to the inner face 32 of the brake jaw 23.

When the brake jaw 23 is actuated by a wedge element 22, the brake jaw 23 pivots radially inwardly around the pivot axis Y. The projection 34 and the recess 35, according to FIG. 3, comprise pairs of symmetric wedge faces 39 and 40. When the brake jaw 23 is acted upon by circumferential forces via the second plates 13, there occurs additional radial forces at the projection in both relative directions of rotation, which radial forces are directed inwardly and intensify the braking effect.

The mode of operation of the brake jaw 23 and the way in which it cooperates with the actuating device 15 are as follows:

The viscous coupling 1 is used in the driveline of a motor vehicle which comprises an electronic control system for controlling the driving dynamics of the vehicle. The controllable connecting means are switched as a function of driving condition parameters which are generated by the control system. Under normal operating conditions, i.e. when the electromagnet 16 is switched off, the anchor plate 17 is loaded by the spring means 18 towards the annular chamber 7. As a result, the wedge elements 22 which are firmly connected to the anchor plate 17 are axially displaced away from the electromagnet 16, and load the brake jaws 23 radially inwardly along their entire length. In this way, the inner faces 32 of the brake jaws 23 are connected by friction locking to the outer circumference of the second plates 13, so that they rotate jointly around the longitudinal axis Z. This position is referred to as the closed position. The viscous coupling is in operation and is able to transmit a torque between the housing 3 and the hub 2 as a result of shear forces in the highly viscous medium, which are generated between the first and the second plates during a relative rotation.

If certain driving condition parameters occur, the electromagnet 16 is switched on and the anchor plate 17 is drawn against the electromagnet 16. As a result, the wedge elements 22 which are firmly connected to the anchor plate 17 axially roll towards the electromagnet 16. The brake jaws 23 are thus released and are no longer loaded radially inwardly. In this way, the friction-locking connection between the inner faces 32 of the brake jaws 23 and the circumferential faces of the second plates 13 are eliminated, so that the latter are now able to rotate freely relative to the housing 3. This position is referred to as the open position. The viscous couping is out of operation and can no longer transmit torque between the first and the second plates 12, 13. This is particularly important when an anti-lock braking system (ABS) or an electronic stabilization program (ESP) is activated in order to ensure that the viscous coupling cannot counteract the engagement.

What is claimed is:

1. A controllable viscous coupling for generating a locking effect between two coupling parts rotatable relative to one another around a common longitudinal axis, for the driveline of a motor vehicle, comprising a first coupling part, a second coupling part, wherein the first and the second coupling part form a sealed annular chamber which is at least partially filled with a highly viscous medium, first plates connected to said first coupling part in a rotationally fast way, second plates connectable to said second coupling part in a rotationally fast way, wherein said first and second plates are arranged in said annular chamber so as to alternate in the longitudinal direction, controllable connecting means settable between an open position in which said second plates are freely rotatable relative to said second coupling part, and a closed position wherein said second plates are connected to the second coupling part in a rotationally fast way, and wherein said connecting means is held in said second coupling part and comprises at least one brake jaw which acts on said second plates, thereby radially loading said second plates on the outer circumference.

2. A viscous coupling according to claim 1, wherein said second plates are connected to said connecting means in a friction locking way when in the closed condition.

3. A viscous coupling according to claim 1, wherein said second plates are connected to said connecting means in a form-fitting way in the closed condition.

4. A viscous coupling according to claim 3, wherein said second plates form the outer plates, and wherein said connecting means is effective between the outer plates and the second coupling part in the form of a rotational housing.

5. A viscous coupling according to claim 1, wherein said connecting means comprises at least one wedge element which is axially displaceable between a first position and a second position wherein said brake jaw which, on its outside, comprises a wedge face which rises in the axial direction and can be actuated by said wedge element.

6. A viscous coupling according to claim 5, wherein said brake jaw is supported in a recess in the inside of said second coupling part so as to be pivotable around pivot axis extending parallel to the longitudinal axis.

7. A viscous coupling according to claim 6, wherein said brake jaw, on its outside, comprises at least one radially outwardly directed projection which engages a corresponding recess of said second coupling part and serves as an abutment.

8. A viscous coupling according to claim 7, wherein said one projection comprises at lest one wedge face and wherein said corresponding recess comprises at least one counter face, and wherein said wedge face and counter face cooperate and, under the influence of circumferential forces acting on said brake jaw, push the latter radially inwardly.

9. A viscous coupling according to claim 8, wherein said wedge element is effective between said second coupling part and said brake jaw and, if viewed in a cross-section, applies a radial force to said brake jaw at a distance from said pivot axis, or releases same.

10. A viscous coupling according to claim 5, wherein said wedge element engages a longitudinally extending groove in a convex outer face of said brake jaw on the one hand and a longitudinally extending groove in the inner face of said second coupling part on the other hand.

11. A viscous coupling according to claim 10, wherein said wedge element comprises a supporting face which is at least indirectly supported against a parallel counter face of said second coupling part, as well as a pressure face which forms a wedge together with said supporting face and which serves to load said wedge face of said brake jaw.

12. A viscous coupling according to claim 11, wherein said supporting face and said pressure face of said wedge element have a plurality of oblong pockets which are distributed along the length of said wedge element and in which there are arranged rolling contact members to reduce the friction in the region of contact with said counter face, and said rolling contact members projecting beyond said supporting face and said pressure face respectively.

13. A viscous coupling according to claim 12, wherein the length of said pockets is greater than the maximum distance which can be covered by said wedge element between said first and second position.

14. A viscous coupling according to any one of claims 1 to 3 and 5 to 13, wherein an actuating device for said controllable connecting means comprises an electromagnet and an anchor plate which is arranged at an axial distance from said electromagnet and is loaded by spring means in the direction away from said electromagnet.

15. A viscous coupling according to claim 14, wherein said electromagnet is supported by a rolling contact bearing on said second coupling part in such a way that it is coaxially rotatable relative thereto and axially non-displaceable relative thereto.

16. A viscous coupling according to claim 10, wherein there is provided three groups of connecting means, each having one wedge element and one brake jaw which are uniformly circumferentially distributed around the longitudinal axis, wherein said three wedge elements are firmly connected to an anchor plate and are displaced simultaneously when an actuating device is switched on.

* * * * *